United States Patent
Huang

(10) Patent No.: US 9,482,209 B2
(45) Date of Patent: Nov. 1, 2016

(54) SOLAR WATER HEATER

(71) Applicant: Lai Fan Huang, Hacienda Heights, CA (US)

(72) Inventor: Lai Fan Huang, Hacienda Heights, CA (US)

( * ) Notice: Subject to any disclaimer, the term of this patent is extended or adjusted under 35 U.S.C. 154(b) by 191 days.

(21) Appl. No.: 14/527,179

(22) Filed: Oct. 29, 2014

(65) Prior Publication Data

US 2016/0123309 A1  May 5, 2016

(51) Int. Cl.
  *F03G 6/00* (2006.01)
  *F24J 2/05* (2006.01)
  *F24J 2/26* (2006.01)
  *F24J 2/34* (2006.01)
  *F24J 2/42* (2006.01)

(52) U.S. Cl.
  CPC ............... *F03G 6/003* (2013.01); *F24J 2/055* (2013.01); *F24J 2/268* (2013.01); *F24J 2/345* (2013.01); *F24J 2/42* (2013.01)

(58) Field of Classification Search
  CPC .............. F24J 2/00; F24J 2/04; F24J 2/0422; F24J 2/0483; F24J 2/05; F24J 2/055; F24J 2/20; F24J 2/207; F24J 2/345; Y02E 10/40–10/47; F28B 9/02; F03G 6/00–6/068
  USPC ...................... 126/640–642; 60/641.8–641.15
  See application file for complete search history.

(56) References Cited

U.S. PATENT DOCUMENTS

| | | | | | |
|---|---|---|---|---|---|
| 3,927,659 | A | * | 12/1975 | Blake | F22B 1/00 126/643 |
| 3,952,725 | A | * | 4/1976 | Edmondson | F24J 2/268 126/659 |
| 4,485,803 | A | * | 12/1984 | Wiener | F03G 6/065 126/591 |
| 5,896,746 | A | * | 4/1999 | Platell | F01K 23/065 60/618 |
| 6,301,893 | B1 | * | 10/2001 | Luo | F03G 6/065 60/641.1 |
| 8,353,286 | B2 | * | 1/2013 | Li | F24J 2/055 126/640 |
| 2010/0258112 | A1 | * | 10/2010 | Viskup, Jr. | F22B 1/006 126/645 |
| 2012/0067338 | A1 | * | 3/2012 | Funcheon | B01D 1/0035 126/602 |
| 2012/0324891 | A1 | * | 12/2012 | Raab | F01K 3/10 60/668 |

* cited by examiner

*Primary Examiner* — Thomas Denion
*Assistant Examiner* — Laert Dounis
(74) *Attorney, Agent, or Firm* — Clement Cheng

(57) ABSTRACT

A solar water heater has a main panel having a boiler panel and a reservoir panel. The reservoir panel feeds the boiler panel. A tubular reservoir is installed in the reservoir panel. An evacuated tube is installed in the boiler panel. The evacuated tube has an inner vacuum wall and an outer vacuum wall for insulating the evacuated tube. A boiler line receives heated water from the reservoir panel. The boiler line passes through the evacuated tube. An electrical production module is connected to the boiler panel. The electrical production module generates electricity from steam power taken from the boiler panel. A feed line connects to the reservoir panel. The feed line ends at an intake filter.

7 Claims, 2 Drawing Sheets

SOLAR WATER HEATER

FIELD OF THE INVENTION

The present invention is in the field of solar water heaters.

DISCUSSION OF RELATED ART

A variety of different solar water heaters have been made in the prior art. McConnell involves the use of glass pipes evacuated tubes as a solar energy absorber as described in U.S. Pat. No. 4,474,170 to McConnell et al, entitled Glass Heat Pipe Evacuated Tube Solar Collector, issued on Oct. 2, 1984, the disclosure of which is incorporated herein by reference. The McConnell design includes evacuated pipes. Solar energy is absorbed into glass pipes, and the pipes are used to transfer the absorbed solar energy to the working fluid. The inside surface of the heat pipe is comprised of granular glass particles in order to enhance the thermal distribution of transfer liquid in the pipe. Externally, the heat pipe surface has outer coatings to increase solar absorption and limit energy radiation.

Using a solar collector to maximize efficiency is taught by U.S. Pat. No. 8,640,474 entitled System and Method for Increasing the Efficiency for Solar Heating System, issued to Ackner et al, on Feb. 4, 2014, the disclosure of which is incorporated herein by reference. Ackner discusses thermal enhancing tubes attached to a solar collector system. Each tube is paired to a designated fluid control valve, this pairing exist in order to operate between an active and inactive state. The alternate transfer between the tube and the system optimizes thermal transfers and creates an efficient flow of fluid through the system.

Solar water heating is also described in U.S. Pat. No. 8,353,286 entitled Solar Water Heater and Method, issued to Yangson, Li on Jan. 15, 2013, the disclosure of which is incorporated herein by reference. Yangson suggests multiple elongated water heating units. Each unit is systematically connected and uses the inner and outer glass tubes. The glass tubes collects and conserves the internal thermal energy. A metal water container extends through an opening in the tubes. The fluid is then heated through heat transfer between the inner glass tubes and metal container.

Solar heated water is also discussed in U.S. Pat. No. 3,952,725 to inventor Edmondson entitled Solar water Heater issued on Apr. 27 1976, the disclosure of which is incorporated herein by reference. Edmondson is a solar water heater receiving heat by sun rays through light transmitting panes which then heats conduction foil arranged on conductive water-conveying tubes. Glass and wool are used between the foil and panes to limit convection. Edmondson teaches heat transfer maximization by conductive cement or paint applied between the foil and tubing.

SUMMARY OF THE INVENTION

A solar water heater has a main panel having a boiler panel and a reservoir panel. The reservoir panel feeds the boiler panel. A tubular reservoir is installed in the reservoir panel. An evacuated tube is installed in the boiler panel. The evacuated tube has an inner vacuum wall and an outer vacuum wall for insulating the evacuated tube. A boiler line receives heated water from the reservoir panel. The boiler line passes through the evacuated tube. An electrical production module is connected to the boiler panel. The electrical production module generates electricity from steam power taken from the boiler panel. A feed line connects to the reservoir panel. The feed line ends at an intake filter.

The electrical production module further includes a turbine or engine that powers a generator to create electrical power. A photovoltaic solar panel powers a boiler feed water pump. A support stand supports the main panel at an angle for receiving solar radiation. A feed water pump connects to an intake line. The intake line is connected to the tubular reservoir.

A boiler feed water pump is connected to a boiler feed line. The boiler feed line is connected to the tubular reservoir. The boiler water pump sends water to the boiler line. The boiler line has a plate fin bonded to the boiler line. The plate fin has three flat collector areas, namely a first collector area, a second collector area and a third collector area. The second collector area is mounted between a loop of the boiler line. The plate fin receives a loop of the boiler line in a pair of boiler line channels, namely an incoming boiler line channel and an outgoing boiler line channel. A water tank receiving water or steam from the electrical production module. A dip tube extending into the water tank. The dip tube guides the feed line and intake filter to water held within the tank. A float nozzle having a density less than water. The float nozzle has a nozzle tip opening for exhausting steam or water from the electrical production module.

Figure 1:
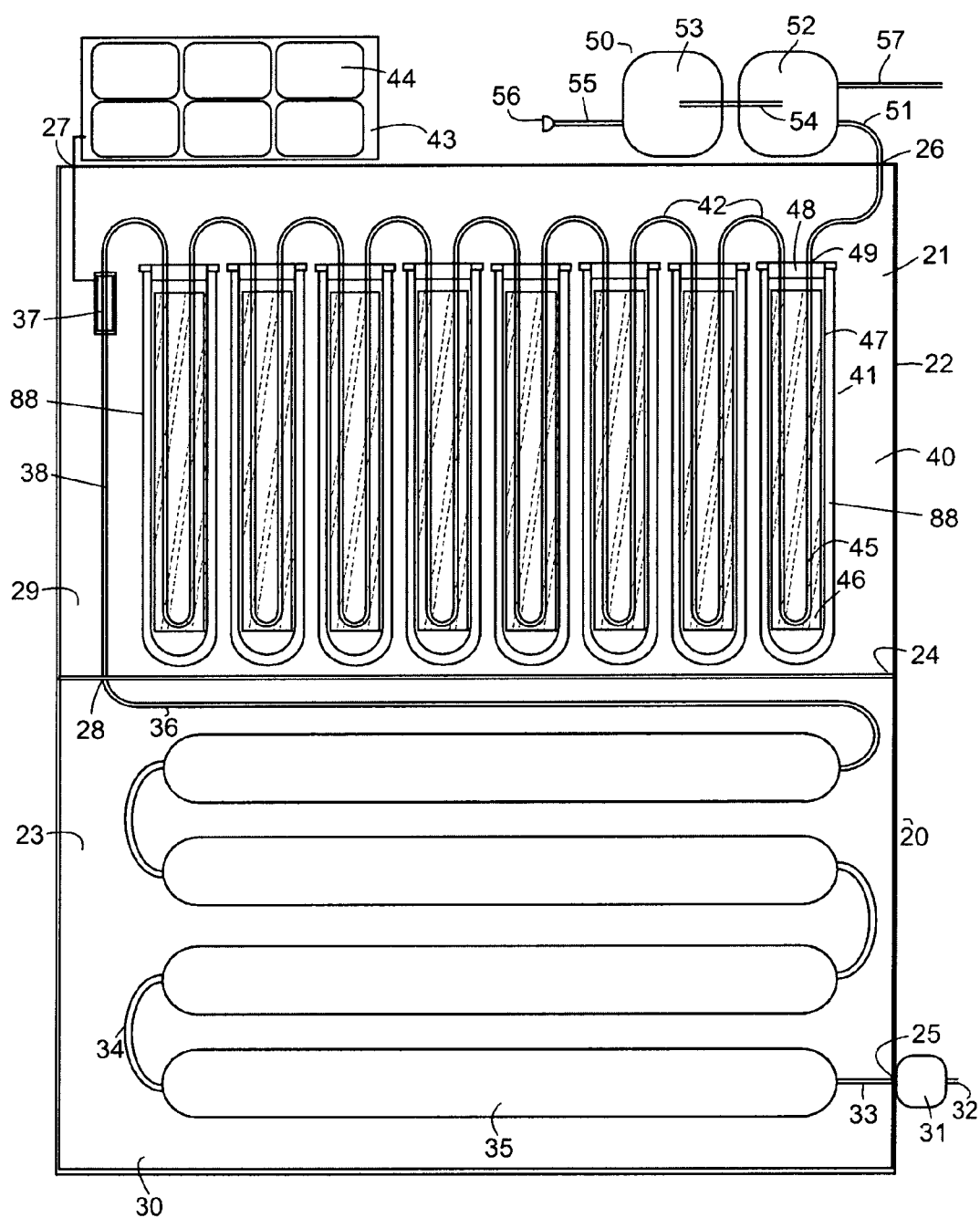
FIG. 1 is a top plan view diagram of the main panel.
Figure 2:
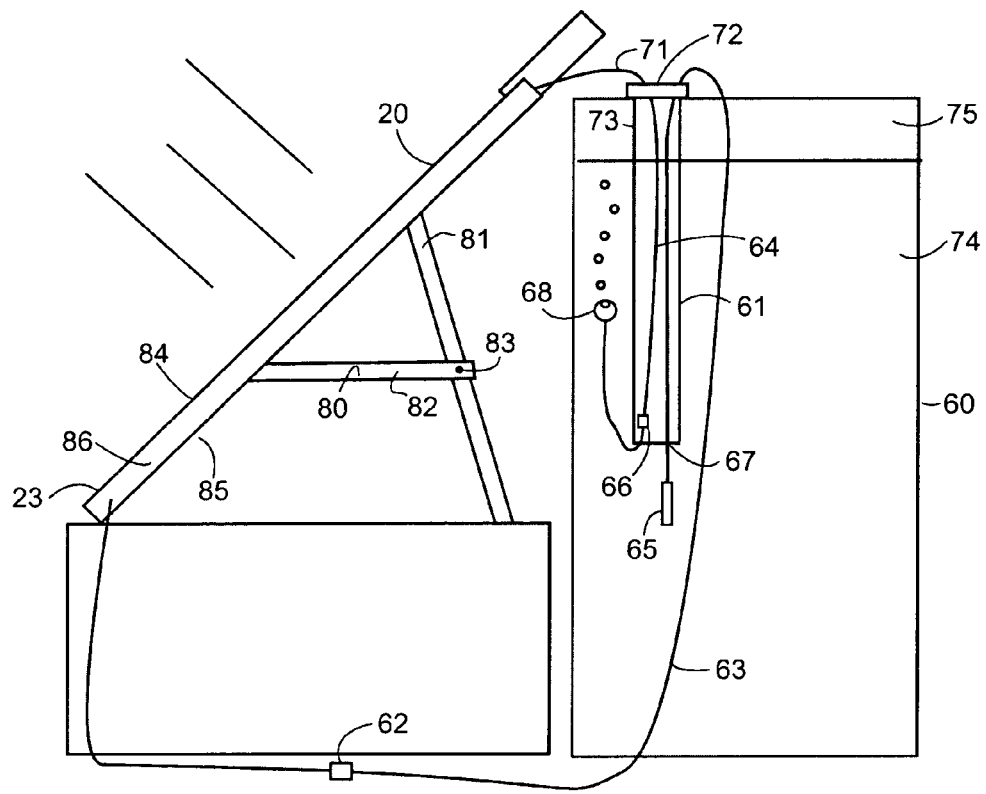
FIG. 2 is a side view diagram of the hot water heater system.
Figure 3:
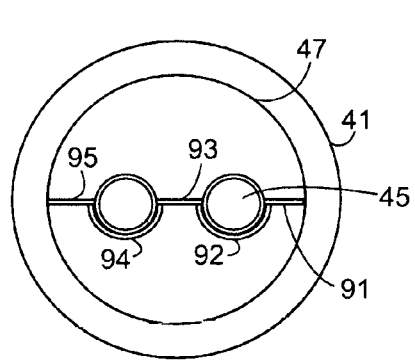
FIG. 3 is a cross-section view of the evacuated tube.
Figure 4:
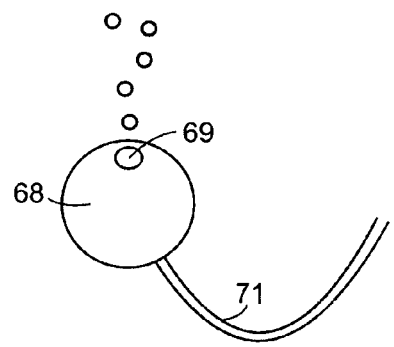
FIG. 4 is a close-up view of the float nozzle.

The following callout list of elements can be a useful guide for referencing the element numbers of the drawings.

20 Main Panel
21 Panel Back
22 Panel Wall
23 Glass Cover
24 Panel Divider
25 Intake Opening
26 Exit Opening
27 Solar Connection
28 Divider Opening
29 Blackened Backdrop
30 Reservoir Panel
31 Feed Water Pump
32 Feed Line
33 Intake Line
34 Reservoir Connecting Tube
35 Tubular Reservoir
36 Divider Line
37 Boiler Feed Water Pump
38 Boiler Feed Line
40 Boiler Panel
41 Outer Vacuum Wall
42 Plate Line Bends
43 Solar Panel
44 Solar Cell
45 Boiler Line
46 Plate Fin
47 Inner Vacuum Wall
48 Evacuated Tube Retainer
49 Evacuated Tube Retainer Opening
50 Module Product Electrical
51 Turbine Intake Line
52 Turbine 53 Generator
54 Shaft
55 Power Cord
56 Plug
57 Outlet Line
60 Water Tank
61 Dip Tube
62 Feed Water Pump Backflow Valve
63 Feed Line Flexible Portion
64 Dip Tube Feed Line
65 Intake Filter
66 Exit Check Valve
67 Dip Tube Lower Opening
68 Float Nozzle
69 Nozzle Tip
71 Flexible Exit Line
72 Dip Tube Retainer Seal
73 Dip Tube Sidewall
74 Water
75 Air Gap
76 Water Line
80 Support Stand
81 Panel Support
82 Panel Support Cross Bar
83 Crossbar Pin
84 Glass Side
85 Insulated Back
86 Insulated Side
88 Evacuated Tube
91 First Collector Area
92 First Channel
93 Second Collector Area
94 Second Channel
95 Third Collector Area

DETAILED DESCRIPTION OF THE PREFERRED EMBODIMENT

The present invention is a solar water heater that also produces electricity from steam power. The preferred embodiment is designed for residential use to heat hot water and produce household electric current, but can also be used in other contexts. The main panel 20 can be made with a panel back 21 connected to four panel walls 22. A panel divider 24 can segment the reservoir panel 30 from the boiler panel 40. The main panel has a glass cover 23 that can be a single or double pane construction. The panel divider 24 and the panel walls 22 are preferably insulated by polyurethane foam board on an internal surface of the main panel. The walls can be made of an aluminum extrusion joined at the corners of the walls. As the main panel 20 faces the sun during the day, solar energy is retained as heat in the main panel, which is filled with atmospheric pressure air and heat collectors.

The main panel 20 has an intake opening 25 that allows entry of a feed line 32. The intake opening 25 is adapted to a feed water pump 31 that pumps water from the feed line 32. The intake opening 25 can be a connector such as a bushing. The intake opening 25 connects to the intake line 33. The intake line 33 next to a tubular reservoir 35 that may have rounded ends for retaining batches of water to receive solar energy from the sun. The tubular reservoirs 35 can be connected together at reservoir connecting tubes 34. The tubular reservoirs can be chained together in a series up to a divider line 36. The tubular reservoirs 35 can be made of copper pipe that have their ends finished so that they are seamlessly connected to copper reservoir connecting tubes 34. The ends of the tubular reservoirs 35 can be made as rounded members.

The divider line 36 brings the warm water from the tubular reservoir batch heater of the reservoir panel 30 to a divider opening 28 where it connects to a boiler feed line 38 in the boiler panel 40. The boiler feed line 38 connects to a boiler feed water pump 37 that pumps water through a series of evacuated tubes. The pump 37 can be a boiler feed pump having a built in one way flow valve to prevent boiler pressure from backing into the reservoir panel 30. The boiler panel 40 may have a blackened backdrop 29 that extends from the boiler panel 42 the reservoir panel 30. The photovoltaic solar cells 44 can be grouped into a solar panel 43 that provides a solar electric power solar connection 27 to the boiler feed water pump 37.

The boiler feed water pump 37 can be connected to the solar connection 27 which can be made as a bus that connects to the generator 53. Water and steam pass through evacuated tubes 88 aligned in an array so that they increase successively in heat and thermal energy. The evacuated tubes 88 are covered by retainers 48. The boiler feed line 38 connects to the boiler line 45. Plate line bends 42 pass the boiler line 45 through a retainer opening 49 of the retainer 48. The boiler line 45 can be formed to a plate fin 46 such as by crimping or by a snap on construction. The vacuum tubes 88 have an inner vacuum wall 47 and an outer vacuum wall 41 with a vacuum formed between the inner vacuum wall 47 and the outer vacuum wall 41.

After the sunlight passes through the glass cover 23, the sunlight strikes the plate fin 46 which can be blackened. The plate fin can be mechanically connected to the boiler line 45. The plate fin 46 includes three flat collector areas, namely a first collector area 91, a second collector area 93, and a third collector area 95. The three collector areas are connected at a first channel 92 and a second channel 94. The channels are shaped to receive the boiler line 45. The plate fin and the boiler line 45 can be formed as a single unit in manufacturing so that the single unit can be connected in series. Preferably, the first collector 91 and the third collector 95 do not touch the inner vacuum wall 47.

Evacuated tubes 88 trap heat from the sun to provide heating to the boiler line 45. Sizing for the evacuated tubes and the plate fins should rely on heat transfer calculations rather than unnecessary trial and error. The boiler panel 40 may be at a higher temperature than the reservoir panel 30, but they can both be subpanels of the main panel 20 by sharing structural components such as the panel back 21 and the blackened backdrop 29. The panel back 21 and the blackened backdrop 29 can be made as a sheet of aluminum for the panel back 21, and a painted or anodized surface for the blackened backdrop 29. Preferably, steam exits on a turbine intake line 51 from the main panel 20 at an exit opening 26.

An electrical production module 50 generates electricity from the turbine exit line 51. The turbine intake line 51 is received by the turbine 52. The turbine 52 rotates a shaft 54 that powers a generator 53. The generator generates electricity that can be output to a power cord 55 at a plug 56. If the generator can produce AC power at household electric current, such as by including a power conditioning circuit, the power cord 55 can provide electricity to a plug 56. The electrical production module 50 can be mounted to the panel wall 22 or to an underside of the panel back 21. The turbine 52 could also be an engine such as a two-stroke engine.

The panel 20 is preferably oriented at an angle so that the glass cover 23 faces the sun. The glass side 84 of the panel is opposite the insulated back side 85 of the panel. The panel has insulated sides 86 that do not face the sun. The panel 20 is held up by a support stand 80 that can have a one or more panel supports 81 that are connected to a panel support crossbar 82 at a crossbar pin 83. The panel 20 can be placed on a platform or on top of a water tank. Typically, the panel would be placed on the ground, or on a roof such as a concrete substrate roof that can support the weight of the panel.

The water tank 60 can be placed next to the panel so that the water tank can receive steam or condensation from the outlet line 57 from the turbine 52. The outlet line 57 can be made of copper tubing that connects to a flexible exit line 71 that can be made of plastic. The water tank 60 has an opening for a dip tube 61. The dip tube 61 has a dip tube sidewall 73. The dip tube sidewall 73 receives the flexible exit line 71 and the feed line flexible portion 63 and retains both at a dip tube retainer seal 72. The dip tube 61 is thus sealed at the top and has a dip tube lower opening 67 at a lower end of the dip tube 61. The dip tube feed line 64 connects to an intake filter 65 which can be weighted down. Water enters the intake filter 65 and enters the dip tube feed line 64 and then travels to the feed line flexible portion 63 through the feed water pump backflow valve 62. The feed water pump backflow valve 62 is then connected to a feed line 32 which is connected to the intake opening 25 of the panel 20.

The exiting steam and condensation passes through the flexible exit line 71 and then the exit check valve 66. The exiting steam and condensation exit a nozzle tip 69 of a float nozzle 68. The float nozzle can be a ball shape or other float shape and filled with a ballast or a buoyant material to direct exiting steam and condensation. The exiting hot water or steam warms the water in the water tank 60 so that the water tank 60 becomes a hot water tank. The water tank 60 is preferably insulated for improved thermal performance.

Preferably, the solar water heater and electrical generation system does not require any battery or electrical power to operate. The feed water pump 31 and the boiler feed water pump 37 can both be powered from an electrical connection with the solar panel 43 or from an electrical connection with the power cord 55.

The invention claimed is:

1. A solar water heater comprising:
   a. a main panel having a boiler panel and a reservoir panel, wherein the reservoir panel feeds the boiler panel;
   b. a tubular reservoir installed in the reservoir panel;
   c. an evacuated tube installed in the boiler panel, wherein the evacuated tube has an inner vacuum wall and an outer vacuum wall for insulating the evacuated tube;
   d. a boiler line receiving heated water from the reservoir panel, wherein the boiler line passes through the evacuated tube;
   e. an electrical production module connected to the boiler panel, wherein the electrical production module generates electricity from steam power taken from the boiler panel;
   f. a feed line connecting to the reservoir panel, wherein the feed line ends at an intake filter;
   g. a water tank receiving water or steam from the electrical production module; and
   h. a float nozzle having a density less than water, wherein the float nozzle has a nozzle tip opening for exhausting steam or water from the electrical production module.

2. The solar water heater of claim 1, wherein the electrical production module further includes a turbine or engine that powers a generator to create electrical power.

3. The solar water heater of claim 1, wherein a photovoltaic solar panel powers a boiler feed water pump.

4. The solar water heater of claim 1, further comprising a support stand that supports the main panel at an angle for receiving solar radiation.

5. The solar water heater of claim 1, further comprising a feed water pump connected to an intake line, wherein the intake line is connected to the tubular reservoir.

6. The solar water heater of claim 1, further comprising a boiler feed water pump connected to a boiler feed line, wherein the boiler feed line is connected to the tubular reservoir, wherein the boiler water pump send water to the boiler line.

7. The solar water heater of claim 1, wherein the boiler line has a plate fin bonded to the boiler line.

\* \* \* \* \*